INVENTORS
Manfred Börner &
Jürgen Spitzner
BY Spencer & Kaye
ATTORNEYS

INVENTORS
Manfred Börner &
Jürgen Spitzner
BY Spencer & Kaye
ATTORNEYS

INVENTORS
Manfred Börner &
Jürgen Spitzner
BY Spencer & Kaye
ATTORNEYS

United States Patent Office 3,445,792
Patented May 20, 1969

3,445,792

MECHANICAL FREQUENCY FILTER WITH ADDITIONAL COUPLING TO INCREASE SLOPE OF DAMPING RISE

Manfred Börner and Jürgen Spitzner, Ulm (Danube), Germany, assignors to Telefunken Patentverwertungs-G.m.b.H., Ulm (Danube), Germany Filed June 28, 1963, Ser. No. 291,398
Claims priority, application Germany, June 28, 1962, T 22,382
Int. Cl. H03m 7/10
U.S. Cl. 333—71 9 Claims The present invention relates generally to the filter art, and, more particularly, to a mechanical frequency filter having dips in the filter characteristics, by means of which many filter characteristics can be obtained with mechanical means.

For certain purposes a narrow band damping maximum in the filter curve is desired within the passband of the filter curve in order to suppress one or more frequencies. At other times, it is necessary to produce narrow band damping maxima (hereinafter referred to as dips) at the flanks at the sides of the filter characteristic in order to increase the slope of the damping rise.

Heretofore such filter characteristics could be produced by means of electrical filters only. There now exist mechanical filters which are composed of mechanical resonance elements and mechanical coupling elements. The resonance elements, for certain frequencies, have resonance characteristics. Such filters are equipped at their inputs and outputs with electromechanical transducers, for example, in the form of magnetostrictive elements, so that they can be used in electric circuits as four-terminal networks. It is possible to draw the electrical equivalent circuit diagram for such filters, so that conventional four-terminal theories now applicable to electrical filters can also be used for the mechanical filters.

In the case of the electromechanical analogy, the input current and input voltage of the four-terminal network are represented by the elastic force and the speed, respectively, at the input of the mechanical four-terminal networks, while the output current and output voltage correspond to the force and speed at the output end of the mechanical four-terminal network.

The known mechanical filters produce electrical equivalent circuit diagrams which can be designated as coupling filters and which do not have any dips of the filter characteristic within finite limits. It has already been proposed to produce pole positions or terminals in such mechanical filters by introducing couplings between the filter elements that are connected as a four-terminal network and by coupling elements thereto which serve as two-terminal elements.

A main object of the present invention is to provide another arrangement of such terminals.

A further object of the invention is to provide a device of the character described which is simple in construction.

These objects and others ancillary thereto are accomplished according to preferred embodiments of the present invention which uses as the starting point a mechanical frequency filter which comprises at least three resonators which are connected to each other by means of mechanical coupling lines in the form of a chain circuit. In order to produce the dips in the filter characteristic, according to the present invention, this is performed by coupling together mechanically non-successive resonators of such a frequency filter, i.e., to provide additional coupling lines which mechanically couple resonators that do not immediately follow each other.

Additional objects and advantages of the present invention will become apparent upon consideration of the following description when taken in conjunction with the accompanying drawings in which.

Figure 1:
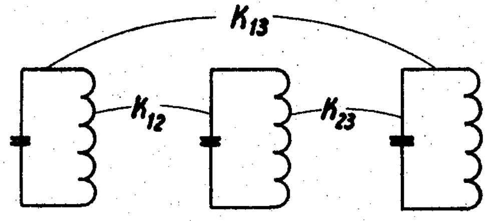
FIGURE 1 is a circuit diagram which is the electrical equivalent of a mechanical filter having three resonators.
Figure 2:
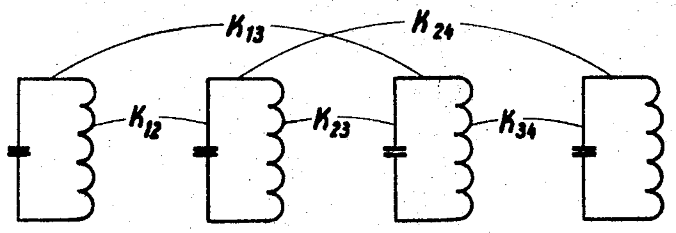
FIGURE 2 is a circuit diagram which is the electrical equivalent of a mechanical filter having four resonators.

With more particular reference to the drawings, the mechanical freqency filter whose electrical equivalent circuit is shown in FIGURE 1 includes three resonators which are mutually coupled by $K_{12}$ and $K_{23}$. In order to produce dips there is provided an additional coupling between the first and third resonance by the coupling $K_{13}$. In the four-resonator filter, whose equivalent circuit is shown in FIGURE 2, there are, in addition to the coupling lines $K_{12}$, $K_{23}$ and $K_{34}$, the additional couplings $K_{13}$ and $K_{24}$.

In the filter according to FIGURE 1, there is a dip above or below the passband of the filter. Whether this dip is above or below, depends on the number of phase rotations which occur over the total length of the resonators and/or coupling lines.

Figure 3:
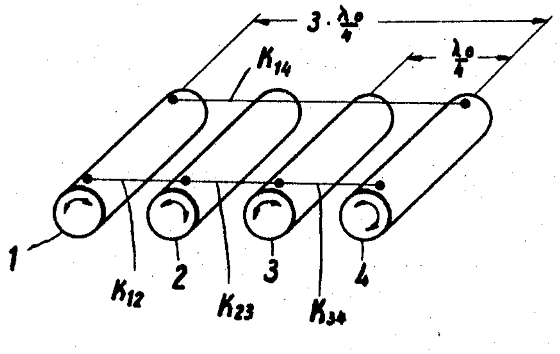
FIGURE 3 is a schematic perspective view of a mechanical filter according to the present invention having four torsional resonators.

FIGURE 3 shows a mechanical filter according to the present invention which includes four torsional resonators 1, 2, 3, and 4. Due to the symmetrical construction, there will be two dips or pole points symmetrical to the middle of the frequency band.

These four resonators are connected by means of coupling rods $K_{12}$, $K_{23}$, and $K_{34}$, which themselves are susceptible of being oscillated in longitudinal direction. The dips are produced by means of the additional coupling $K_{14}$ which is likewise able to be excited so as to be able to oscillate longitudinally.

Basicaly, it is expedient for all of these frequency filters if the length of the coupling lines for successive resonators is $\lambda/4$, to make the additional coupling lines approximately equal to an odd multiple of $\lambda/4$, deviations of $\pm 11\lambda/80$ being permissible. Thus, if each of the coupling lines $K_{12}$, $K_{23}$, and $K_{34}$ in FIGURE 3 has a length of $\lambda/4$, it is recommended that the coupling line $K_{14}$ have a length of $(2n+1)\cdot\lambda/4$.

The filters described so far have certain drawbacks when there are special requirements. Namely, there is a particularly marked change in the propagation time which is particularly disadvantageous if the filter circuit is called upon to transmit pulse-modulated oscillations. In order to avoid these drawbacks, and also in order to compensate for distortions in the phase curve, the following additional feature is provided: the additional coupling lines are connected with the non-successive resonators in such a manner that dips are formed at non-real, i.e., imaginary frequencies, that is to say, the additional coupling lines are, according to this further feature of the present invention, connected with the filter resonators in such a manner that the oscillations which they couple in the real physical frequency range never undergo a phase shift of 180° with respect to the oscillations which the other, normal coupling lines transmit. The phase curve of the propagation constant is, in such filter arrangements in the transmission range of the filter, substantially flatter than in the heretofore described pole filters. By suitable couplng with the additional coupling lines, they can be made even flatter than with normal coupling filters.

Figure 4:
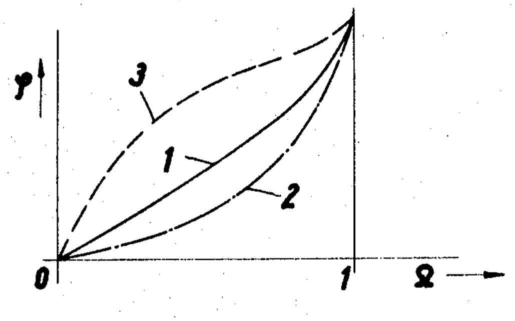
FIGURE 4 is a graph showing the phase curves of three different types of filters.

FIGURE 4 shows the phase curve in the pass range of three different types of filters. The abscissa shows the normalized frequency $$\Omega=\frac{\Delta f}{\Delta f_o}$$

the middle of the pass range being designated $\Delta f=o$ and the edges of the band $\Delta f=\Delta f_o$. The ordinate shows the phase angle $\varphi$. Inasmuch as the transmission time of the transmitted oscillations depends on the slope of the phase curve $d\varphi/df$, there will be no transmission time distortions in the pass range of the filter only if this curve rises substantially linearly. Curve 1 shows the phase of the propagation of a normal coupling filter without additional overcoupling. It shows a relatively straight line increase in the phase angle, the filter thus having relatively small propagation time distortions which do not increase until the edge of the band. Curve 2 shows the phase of the first above-described pole filter. The sagging curve shows that there will be marked distortions in the propagation time. Curve 3 shows the phase of a pole filter which has dips with non-real frequencies according to the further feature of the invention. The phase curve is, depending on how the additional coupling line is connected, more or less upwardly curved. Filters which show such a phase characteristic are suited for compensating undesired phase behavior of the first above-described pole filter.

Figure 5:
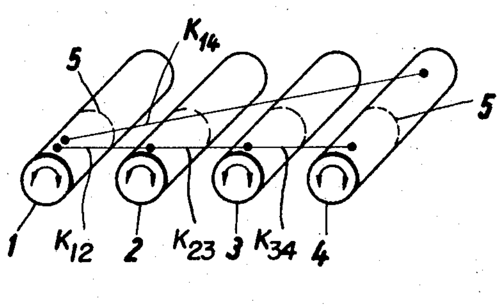
FIGURE 5 is a schematic perspective view of another embodiment of the present invention.
Figure 6:
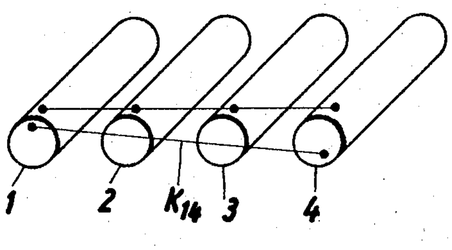
FIGURE 6 is a schematic perspective view of a further embodiment of the invention.

FIGURES 5 and 6 show the further feature of the invention. FIGURE 5 shows the torsion filter with longitudinal couplings $K_{12}$, $K_{23}$, and $K_{34}$ of the immediately adjacent resonators 1, 2, 3, and 4, as well as the longitudinal coupling $K_{14}$ between the resonators 1 and 4. The additional coupling $K_{14}$ must, as explained above and for geometric reasons, have a length of $$3\frac{\lambda_o}{4}$$

This additional overcoupling, because of its length which is dictated by geometrical considerations, brings about an additional 1:−1 phase reversal which is not always desired. In order to change this in such a manner that this overcoupling produces dips only at non-real frequencies, a further phase reversal has to take place for the overcoupling oscillation of 1:−1, i.e., the additional coupling line $K_{14}$ must likewise be given an acoustical length of $\lambda_o/4$.

As shown in FIGURE 5, this phase inversion can, according to the present invention, be obtained as follows: the additional coupling line $K_{14}$ connects one point of the resonator 1 located on one side of the nodal plane 5 with a point of the resonator 4 on the opposite side of this nodal plane 5, i.e., what is connected are two points which, at frequencies directly below the phase inverted passband region, are acoustically oscillating oppositely.

As shown in FIGURE 6 this phase inversion can be obtained by connecting the coupling line $K_{14}$ to the end surface of the first and fourth resonator in such a manner that, at frequencies directly below the phase inverting passband, the points which are connected will be those which acoustically resonate oppositely. The additional coupling within the mechanical filters for producing dips within the filter characteristic are, inherently, possible in different filter types. However, in order to avoid distortion of the phase passage, the filters should be symmetrical because only then will there be obtained symmetrical dips for non-real or imaginary frequencies.

Finally, it is pointed out that small deviations from the coupling lengths of $(2n+1)\cdot\lambda_o/4$ are permitted without there being any change in the principle underlying the present invention. All that will then occur is that there will be a certain amount of detuning of the resonators which can be compensated for by corresponding frequency corrections. Deviations of lengths of the order of $\pm\lambda/8$ can be compensated for without difficulties.

In a filter constructed according to the present invention, two arrangements constructed according to FIGURE 3 were united in such a manner that they had the resonator 4 in common, i.e. the whole arrangement possessed seven resonators 1 to 7, to get a greter attenuation. The resonators were of a nickel-iron alloy with a zero temperature coefficient of the torsional frequency, having a length of 7 mm., a diameter of 4 mm., and a distance from each other of 6.3 mm.

The couplings $K_{12}$, $K_{23}$, $K_{34}$, $K_{45}$, $K_{56}$ and $K_{67}$ were made of four nickel alloy wires of a thickness of 0.12 mm. which were connected to each of the resonators 1 to 7. The coupling $K_{14}$ was made by two similar wires of a thickness of about 0.1 mm. which were connected to the resonators 1 and 4 only, and the coupling $K_{47}$ was made by one similar wire of a thickness of about 0.1 mm., which was connected to the resonators 4 and 7. Further couplings consisting of thin wires between adjacent resonators were arranged to produce minor corrections in the coupling efficiency. The resulting coupling coefficients were $K_{12}=1.14\%$, $K_{23}=1.08\%$, $K_{34}=0.81\%$, $K_{45}=0.84\%$, $K_{56}=0.95\%$, $K_{67}=1.19\%$, $K_{14}=0.47\%$ and $K_{47}=0.21\%$. The drive of the filters was made by two magnetostrictive transducers connected to the resonators 1 and 7 by thin coupling rods, which were both vibrating in a longitudinal mode.

Figure 7:
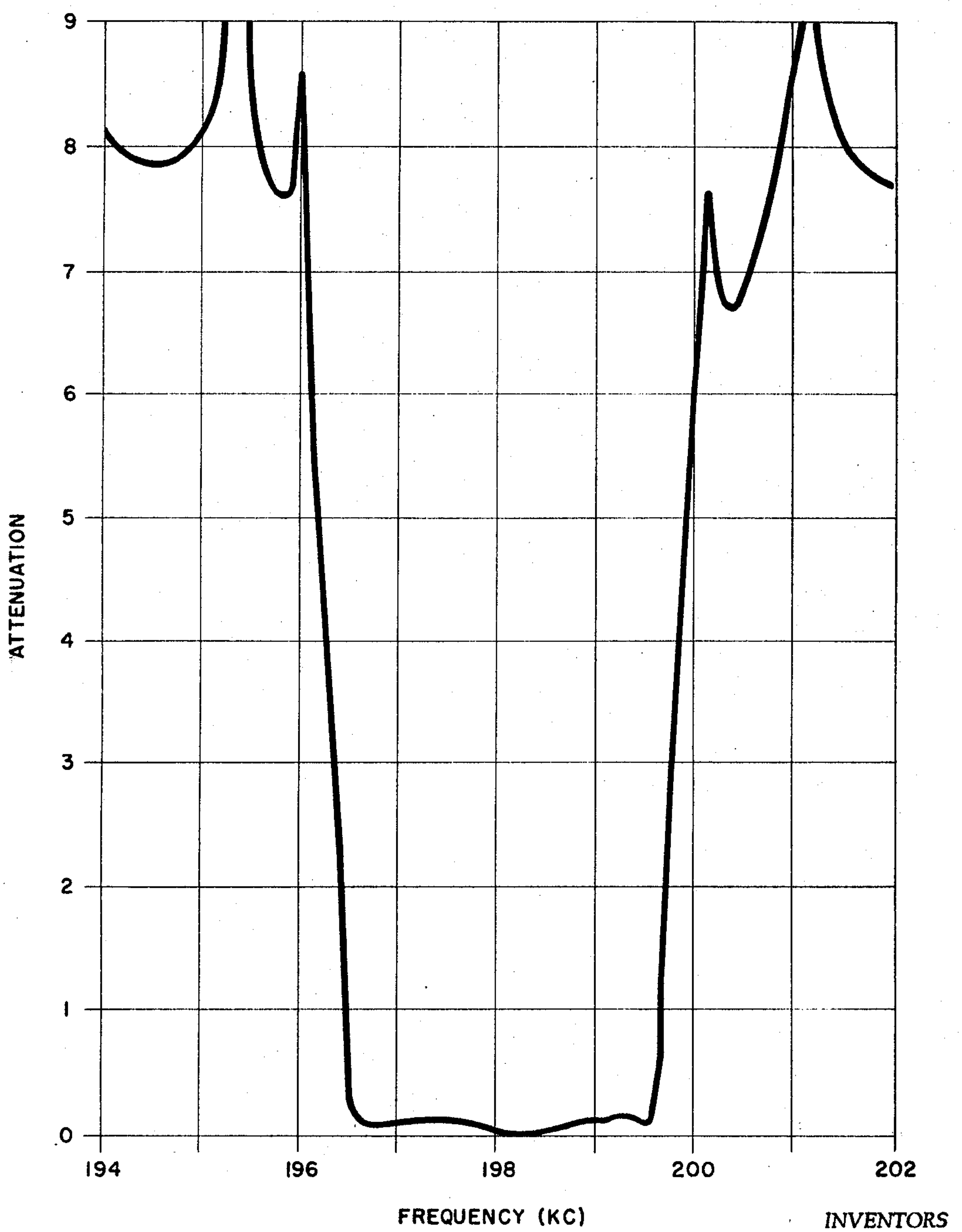
FIGURE 7 is a graph showing the attenuation curve of a filter according to the present invention.

The attenuation curve of this filter is shown in FIGURE 7. The dips at 196 and at 200.15 kc. are due to the coupling $K_{14}$, and the dips at 195.35 and at 201.1 kc. are due to the coupling $K_{47}$.

Though the resonators shown in the accompanying drawings are of the torsionally oscillating type and the coupling lines of the longitudinally oscillating type, the invention is not limited to filters of this type only but is applicable to filters with resonators of the longitudinally oscillating type and coupling lines vibrating in the bending mode, too.

It will be understood that the above description of the present invention is susceptible to various modifications, changes, and adaptations, and the same are intended to be comprehended within the meaning and range of equivalents of the appended claims.

What is claimed is:

1. A mechanical frequency filter, comprising, in combinaton: at least three similarly constructed resonators; mechanical coupling lines connecting adjacent resonators; and coupling means mechanically coupling two resonators which are not adjacent to each other for providing dips in the filter characteristic; the coupling lines which connect adjacent resonators having approximately equal lengths and said coupling means coupling resonators which are spaced from one another by a distance which is approximately an odd multiple of the coupling line length between adjacent resonators.

2. A filter as defined in claim 1 wherein said resonators are all cylindrical and elongated.

3. A filter as defined in claim 1 wherein said coupling means provide dips in the filter characteristic at non-real frequencies.

4. A mechanical frequency filter, comprising, in combination: at least three similarly constructed resonators; mechanical coupling lines connecting adjacent resonators; and coupling means mechanically coupling two resonators which are not adjacent to each other for providing dips in the filter characteristic, the coupling lines which connect successive resonators having a length of approximately $\lambda/4$, and said coupling means having a length which is an odd multiple of $\lambda/4$.

5. A filter as defined in claim 4 wherein at least four resonators are used and said coupling means is provided between the two outer-most resonators.

6. A mechanical frequency filter, comprising, in combination: four spaced torsional resonators having their longitudinal axes parallel and together defining a nodal plane which passes substantially through their mid points; mechanical coupling lines connecting adjacent resonators and being λ/4 in length; and coupling means 3λ/4 in length mechanically coupling the first and fourth resonators at points on the resonator surfaces which at frequencies directly below the phase inverter passband oscillate acoustically oppositely for compensating for the distortion of the phase passage within the passband.

7. A filter as defined in claim 6 wherein the means is connected to the end surfaces on the same side of the filter.

8. A mechanical frequency filter, comprising, in combination: four spaced torsional resonators having their longitudinal axes parallel and together defining a nodal plane which passes substantially through their mid points; mechanical coupling lines connecting adjacent resonators and being λ/4 in length; and coupling means 3λ/4 in length mechanically coupling the first and fourth resonators at points on the resonator surfaces which at frequencies directly below the phase inverter passband oscillate acoustically oppositely for compensating for the distortion of the phase passage within the passband, the point of connection of the coupling means to the first resonator being on one side of the nodal plane and to the fourth resonator being on the other side of the nodal plane.

9. A mechanical frequency filter, comprising, in combination: four spaced torsional resonators having their longitudinal axes parallel and together defining a nodal plane which passes substantially through their mid points; mechanical coupling lines connecting adjacent resonators and being λ/4 in length; and coupling means 3λ/4 in length mechanically coupling the first and fourth resonators at points on the resonator surfaces which at frequencies directly below the phase inverter passband oscillate acoustically oppositely for compensating for the distortion of the phase passage within the passband, the means being connected to the end surfaces on the same side of the filter and being connected to the end surfaces at points on diameters nearly parallel to each other, said points lying on different sides of the plane comprising the axes of the resonators and having a distance of about 3λ/4 from each other.

References Cited

UNITED STATES PATENTS

| | | | |
|---|---|---|---|
| 2,918,634 | 12/1959 | Berovitz | 333—71 |
| 3,013,228 | 12/1961 | Kettel et al. | 333—71 |
| 3,086,182 | 3/1963 | Borner | 333—71 |
| 3,135,933 | 6/1964 | Johnson | 333—71 |

ELI LIEBERMAN, *Primary Examiner.*